(12) United States Patent
Davis et al.

(10) Patent No.: US 10,469,403 B2
(45) Date of Patent: Nov. 5, 2019

(54) SYSTEM ON A CHIP COMPRISING MULTIPLE COMPUTE SUB-SYSTEMS

(71) Applicant: Amazon Technologies, Inc., Seattle, WA (US)

(72) Inventors: Mark Bradley Davis, Austin, TX (US); David James Borland, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 653 days.

(21) Appl. No.: 14/578,004

(22) Filed: Dec. 19, 2014

(65) Prior Publication Data

US 2016/0182398 A1 Jun. 23, 2016

(51) Int. Cl.
| | | |
|---|---|---|
| *H04L 12/911* | (2013.01) | |
| *G06F 12/0811* | (2016.01) | |
| *G06F 13/40* | (2006.01) | |
| *H04L 29/08* | (2006.01) | |
| *G06F 15/78* | (2006.01) | |
| *H04L 12/933* | (2013.01) | |

(52) U.S. Cl.
CPC ........ *H04L 47/782* (2013.01); *G06F 12/0811* (2013.01); *G06F 13/4031* (2013.01); *G06F 15/7807* (2013.01); *G06F 15/7867* (2013.01); *H04L 49/109* (2013.01); *H04L 67/10* (2013.01); *G06F 2213/0038* (2013.01); *Y02D 10/14* (2018.01); *Y02D 10/151* (2018.01)

(58) Field of Classification Search
CPC ............. G06F 13/4031; G06F 12/0811; G06F 15/7807; G06F 15/157867; H04L 47/782; H04L 67/10; H04L 49/109
See application file for complete search history.

(56) References Cited

U.S. PATENT DOCUMENTS

| | | |
|---|---|---|
| 7,412,588 B2 | 8/2008 | Georgiou et al. |
| 7,783,788 B1 * | 8/2010 | Quinn .................. G06F 9/5077 710/10 |
| 8,082,547 B1 | 12/2011 | Herington et al. |

(Continued)

FOREIGN PATENT DOCUMENTS

| | | |
|---|---|---|
| CN | 1871587 | 11/2006 |
| CN | 102270030 | 12/2011 |

(Continued)

OTHER PUBLICATIONS

U.S. Appl. No. 14/578,010, filed Dec. 19, 2014, Titled: System on a Chip Comprising Reconfigurable Resources for Multiple Compute Sub Systems.

(Continued)

*Primary Examiner* — Nimesh G Patel
(74) *Attorney, Agent, or Firm* — Kilpatrick Townsend & Stockton LLP

(57) ABSTRACT

Embodiments can provide additional computing resources at minimal and incremental cost by providing instances of one or more server compute subsystems on a system-on-chip. The system-on-chip can include multiple compute subsystems where each compute subsystem can include dedicated processing and memory resources. The system-on-chip can also include a management compute subsystem that can manage the processing and memory resources for each subsystem.

20 Claims, 10 Drawing Sheets

(56) References Cited

U.S. PATENT DOCUMENTS

| | | | |
|---|---|---|---|
| 8,990,455 B1 | 3/2015 | Owen | |
| 9,264,384 B1* | 2/2016 | Sundaresan | H04L 67/1097 |
| 9,684,597 B1 | 6/2017 | Eiriksson | |
| 2004/0121797 A1* | 6/2004 | Gupta | G06F 1/3203 |
| | | | 455/550.1 |
| 2005/0144223 A1* | 6/2005 | Yang | G06F 12/0866 |
| | | | 709/203 |
| 2006/0136929 A1 | 6/2006 | Miller et al. | |
| 2007/0094419 A1 | 4/2007 | Rajendran | |
| 2007/0209037 A1 | 9/2007 | Sato et al. | |
| 2007/0217439 A1 | 9/2007 | Lemaire et al. | |
| 2008/0086853 A1 | 4/2008 | Nanda et al. | |
| 2008/0122482 A1 | 5/2008 | Sato | |
| 2008/0172524 A1 | 7/2008 | Singh et al. | |
| 2009/0228684 A1* | 9/2009 | Ramesh | G06F 15/7867 |
| | | | 712/29 |
| 2011/0295967 A1 | 12/2011 | Wang et al. | |
| 2012/0079155 A1 | 3/2012 | Damodaran et al. | |
| 2012/0259982 A1* | 10/2012 | Tatsubori | G06F 9/5027 |
| | | | 709/226 |
| 2013/0138836 A1 | 5/2013 | Cohen et al. | |
| 2013/0268706 A1 | 10/2013 | Yun et al. | |
| 2014/0100837 A1 | 4/2014 | Heinen et al. | |
| 2014/0101419 A1* | 4/2014 | Giddi | G06F 11/0742 |
| | | | 713/1 |
| 2014/0254388 A1* | 9/2014 | Kumar | H04L 47/2425 |
| | | | 370/238 |
| 2015/0039790 A1 | 2/2015 | Bonen et al. | |
| 2016/0154760 A9 | 6/2016 | Davis et al. | |

FOREIGN PATENT DOCUMENTS

| | | |
|---|---|---|
| CN | 102693202 | 9/2012 |
| CN | 103502904 | 1/2014 |
| JP | 0844581 | 2/1996 |
| JP | 2001290510 | 10/2001 |
| JP | 2003316752 | 11/2003 |
| JP | 2005044361 | 2/2005 |
| JP | 2005512186 | 4/2005 |
| JP | 2007047986 | 2/2007 |
| JP | 2008044581 | 2/2008 |
| JP | 2010518472 | 5/2010 |
| JP | 2011238231 | 11/2011 |
| JP | 2012038293 | 2/2012 |
| JP | 2014038652 | 2/2014 |
| JP | 6426846 | 11/2018 |
| WO | 2003029995 | 4/2003 |
| WO | 2005022380 | 3/2005 |

OTHER PUBLICATIONS

U.S. Appl. No. 14/622,661, filed Feb. 13, 2015, Titled: Multi-Mode System on a Chip.
U.S. Appl. No. 14/623,914, filed Feb. 17, 2015, Titled: System on a Chip Comprising an I/O Steering Engine.
PCT/US2015/067156 , "International Search Report and Written Opinion", dated May 18, 2016, 10 pages.
JP2017-528810 , "Office Action", dated Jul. 17, 2018, 6 pages.
CN201580069081.3 , "Office Action", dated Jul. 2, 2019, 16 pages.

\* cited by examiner

SYSTEM ON A CHIP COMPRISING MULTIPLE COMPUTE SUB-SYSTEMS

BACKGROUND

Generally, organizations or companies provide computing services over a plurality of communication networks. For example, computing services may include web services such as web storage or virtual servers that can be provided over the Internet to different clients. In some instances, virtual servers may be rented out to clients on an as needed basis.

In some instances, network bandwidth and processing demands may vary depending upon the usage by each client. For example, a first client may fully exploit the network bandwidth and the computing resources on a server that can slow down other clients communicating with the same server.

BRIEF DESCRIPTION OF THE DRAWINGS

Various embodiments in accordance with the present disclosure will be described with reference to the drawings, in which.

DETAILED DESCRIPTION

Figure 1:
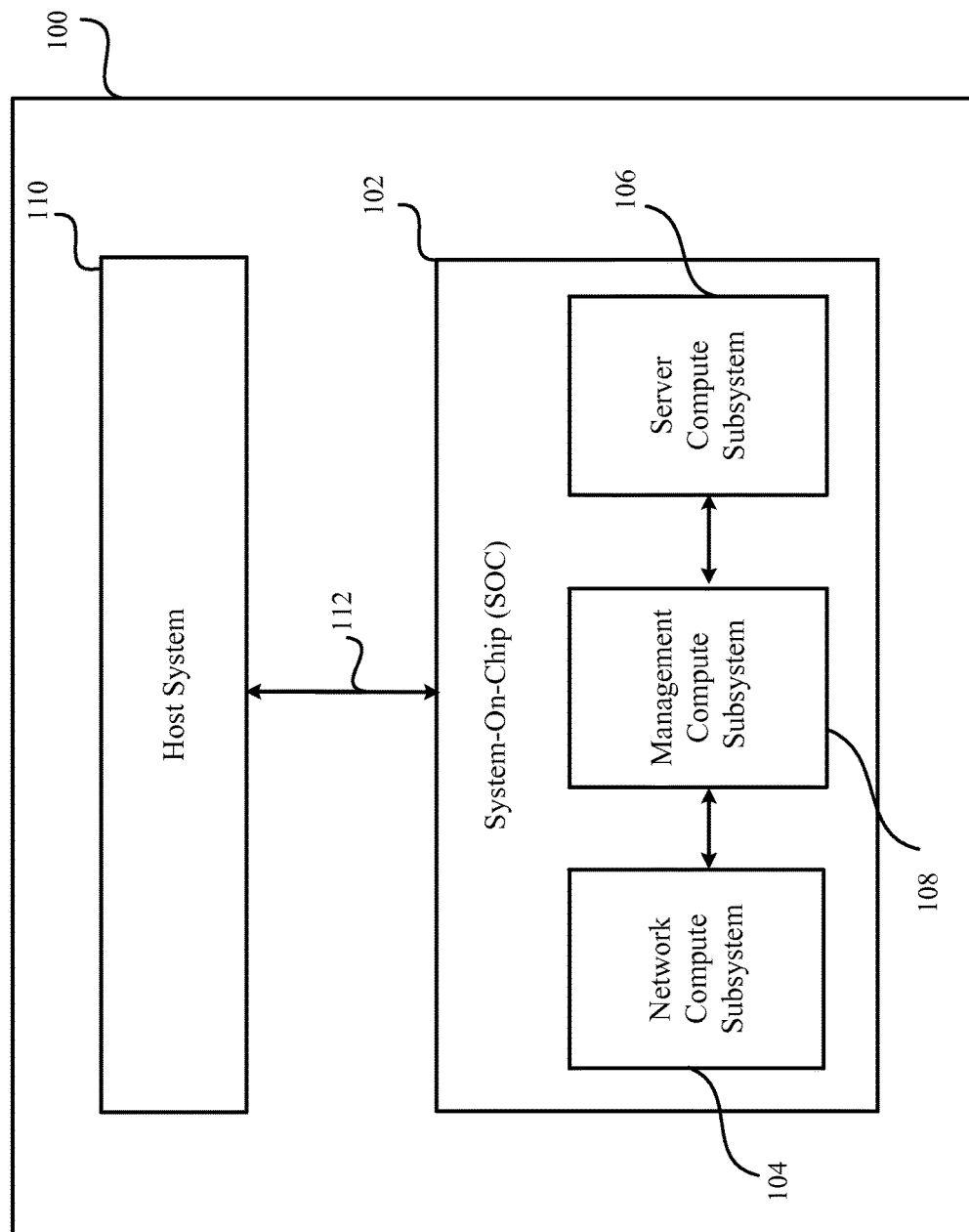
FIG. 1 illustrates a block diagram of a system according to some embodiments of the disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Generally speaking, servers can include an expensive list of items such as power supplies, cooling supplies, networking resources, disc drives, sheet metal, the physical footprint of the server, etc. that can cumulatively result in expensive server systems. Each additional server system can incrementally add to the cost of any infrastructure that needs the compute resources associated with multiple servers. Hence, having additional server systems to provide more computing resources may proportionally add significant cost to the server infrastructure.

Various embodiments of the disclosed technologies can provide additional computing resources at minimal and incremental cost by leveraging and improving the current silicon components present in the system. In some embodiments, a server compute subsystem may be added to a server for providing additional compute resources. For example, the server compute subsystem may be implemented within a System on a Chip (SoC) that already includes network functionality, without significantly increasing the cost. The SoC may include the server compute subsystem for providing compute services and the network compute subsystem for at least managing network traffic for the host system and the server compute subsystem. The newly added server compute subsystem may provide similar benefits to adding an additional server to the infrastructure or server socket to the server. In some embodiments, a compute subsystem may include a subsystem with dedicated processing resources such as processor cores.

Computer networks may typically include a plurality of servers that can host data and provide services to multiple clients or organizations. For example, servers can provide services such as cloud computing, analytics, web services, storage, databases, applications, deployment services, etc. to a potentially larger number of client computers. The clients or organizations can use these services or data to power a wide variety of workloads such as storage, data processing and warehousing, web and mobile applications, archive and many other tasks. Generally, clients request services or data from the servers and the servers respond by executing certain tasks to service the request and/or provide the data over the network. The network traffic may vary depending upon a number of factors such as number of clients requesting services at a certain time, capacity of the servers, etc. In some instances, there may be network congestion when a server is providing services to a number of clients at the same time. For example, one client may be exploiting all of the network bandwidth thus slowing down other clients communicating with the same server.

In some instances, a network system can monitor network traffic to regulate the traffic and to minimize bandwidth congestion. For example, the network system may be communicatively coupled to a host system (e.g., an x86 server) that provides web services to different clients. The network system may include one or more processor cores, caches, network acceleration logic, memory controllers and an I/O subsystem, etc. In some embodiments, the network system may also perform other functions such as traffic shaping, network storage processing, etc. associated with the web services offered by the server (e.g., host system). In some instances, the functionality of the network system may be implemented as a compute subsystem on a System-on-Chip (SoC) that may be communicatively coupled to the host system. For example, the SoC can be coupled to the host system (e.g., one or more servers) using a plug-in card or soldered on the motherboard of the host system.

A typical SoC may include functionalities of a system integrated into a single chip. For example, a SoC can include multiple processor cores, volatile and non-volatile memory modules, memory controllers, one or more internal buses, standard interfaces, peripherals, voltage regulators, power management circuits, timing resources such as oscillators and phase locked loop, etc. Implementing the functionalities of multiple chips on a single chip can reduce manufacturing and assembly costs. In addition, the SoCs generally have smaller footprints and space requirements. Therefore, SoC implementations generally consume less power and are more cost effective as compared to a multi-chip system implementing the same functionality.

Various embodiments of the disclosed technologies can provide additional computing resources at a relatively low (e.g., minimal) and incremental cost by providing instances of one or more server compute subsystems on a system-on-chip. In some embodiments, a server compute subsystem may be added to a server by leveraging the existing infrastructure at the system level. For example, the server compute subsystem may be implemented within a SoC that already includes network functionality, without significantly increasing the cost. The SoC may include the server compute subsystem for providing compute services and the network compute subsystem for at least managing network traffic for the host system and the server compute subsystem. The additional server compute subsystem in the SoC may be, in some aspects, similar to an additional server of the infrastructure or server socket of the server. Some embodiments can allow a completely separate processor instance on the SoC with a pre-defined communication mechanism between the server compute subsystem and the network compute subsystem. In some embodiments, the server compute subsystem may communicate with the network compute subsystem using a standard interface within the SoC, such as the Peripheral Component Interconnect Express (PCIe) interface. This can be similar to the host system communicating with a typical networking SoC (e.g., without having a server compute subsystem) over the PCIe interface. Thus, at least some embodiments can reduce jitter and security concerns by having the compute subsystems communicate over an internal interface within the SoC without interfering with the communication path between the host system and the network compute subsystem of the SoC.

Further, some embodiments provide dedicated resources, e.g., processing and memory resources, for each of the network compute subsystem and the server compute subsystem that may not be shared. Having dedicated resources for each subsystem can minimize the jitter for different clients that may be using the services provided by the host system and the server compute subsystem at the same time. For example, in some instances, when two or more clients communicate with the host system at the same time, there could be network bandwidth issues if the processor and memory resources are shared between the network compute subsystem and the server compute subsystem, which can impact the performance of demanding systems, such as mission critical systems. For example, one client can exploit the resources completely and affect the performance of the other client, thus causing jitter. Furthermore, according to certain implementations, having isolated subsystems can also reduce the security risk for mission critical systems since any security attacks can be contained within the affected subsystem.

Although, at least some embodiments are described and shown as including a single server compute subsystem in the SoC, other embodiments are not limited to including a single server compute subsystem in the SoC. For example, in some implementations, multiple server compute subsystems may be included in a SoC.

FIG. 1 illustrates an exemplary system 100 according to certain embodiments of disclosure described herein. In certain embodiments, an SoC 102 may include a server compute subsystem 106 may be a network compute subsystem 104. The SoC 102 may also include a management compute subsystem 108 that may be configured to manage resources for the network compute subsystem 104 and the server compute subsystem 106.

FIG. 1 illustrates an SoC 102 configured to communicate with a host system 110. The communication between the SoC 102 and the host system 110 may be performed using an interface 112 such as a PCIe interface or any other suitable interface.

In some instances, the host system 110 may provide a multi-tenant platform to multiple clients. For example, the host system 110 may provide services such as cloud computing, cloud storage, analytics, web services, databases, applications, deployment services, etc. to different clients. The host system 110 may include a server, for example, an x86 server. In some embodiments, one or more processors in the host system 110 may be connected to the sockets on the SoC 102. In some implementations, the SoC 102 can be coupled to the host system 110 using a plug-in card or soldered on the motherboard of the host system 110.

The SoC 102 may include a network compute subsystem 104, a server compute subsystem 106 and a management compute subsystem 108. In some embodiments, a compute subsystem may include its own dedicated processing resources such as processor cores. In some embodiments, the network compute subsystem 104 and the server compute subsystem 106 may be physically isolated to minimize jitter and to reduce security risks as discussed previously. In some embodiments, the SoC 102 may be capable to communicate with an external memory (not shown) that may be physically or logically isolated. For example, in one embodiment, the external memory may be physically isolated for each of the compute subsystems and may be accessible by each compute subsystem using their own dedicated memory controllers and memory channels, e.g., there may be an external memory for the network compute subsystem 104 and another external memory for the server compute subsystem 106. In another embodiment, the external memory may be logically isolated (e.g., by software partitioning) and may be accessible by each compute subsystem using a common multiport memory controller and memory channels. Further, it will be understood that the SoC 102 may include other components that may be deemed necessary to perform its intended function and which are not shown here for the purpose of simplicity.

The network compute subsystem 104 may be configured to provide network related functionalities such as network traffic shaping, network acceleration, network storage processing, etc. In some embodiments, the network compute subsystem 104 may include at least some functionalities of a network interface controller (NIC) or a network coprocessor. In certain embodiments, the network compute subsystem 104 may include some functionalities related to web services offered by the host system 110, for example, billing, rate, traffic shaping, encryption, choking, etc. The network compute subsystem 104 may include dedicated processing and memory resources such as processing cores, caches, memory controllers, etc. that may not be shared by the server compute subsystem 106. The network compute subsystem 104 may also include an I/O subsystem that may be configured to interface with the host system 110, server compute subsystem 106 and the network.

The server compute subsystem 106 may be configured to provide compute services, e.g., virtual or physical resources to client computers. For example, the compute services may include launching virtual machine instances of various sizes, associating storage volumes to the virtual machines on demand, providing client computers with resources to run applications by renting virtual machines, data processing, storage, etc. The server compute subsystem 106 may include dedicated processing and memory resources such as processing cores, caches, memory controllers, etc. that may not be shared by the network compute subsystem 104. In some embodiments, the compute subsystem 106 may be included as part of the SoC 102 without adding considerable amounts of additional power supplies, networking resources, cooling supplies, pins, sheet metal, etc. Thus, the server compute subsystem 106 may increase the computing resource similar to adding an additional server to one of the sockets within the host system 110 or adding an additional server system, without the additional cost of associated with it.

In further embodiments, implementing the server compute subsystem 106 as part the SoC 102 can provide lower manufacturing and assembly costs as compared to adding separate server systems to the host system 110. Further, implementing the server compute subsystem 106 on the SoC 102 often does not change the physical footprint or the space requirement at the system level. The SoC implementation according to various embodiments can also provide low power requirements resulting from the server compute subsystem 106 communicating with the network compute subsystem 104 using an internal bus on the SoC 102. These benefits can translate into lower cost for the end user.

In some embodiments, the server compute subsystem 106 may be used to offload some of the work load of the host system 110. In some instances, the host system 110 together with the server compute subsystem 106 may provide high performance compute services. For example, the host system 110 may focus on processing quick turnaround services and may offload any low performance work-loads to the server compute subsystem 106 thus increasing the throughput of the system.

The management compute subsystem 108 may be configured to manage various subsystems of the SoC 102. For example, the management compute subsystem 108 may be configured to provide boot management, resetting and power management of different subsystems and any other SOC management related functionality. The management compute subsystem 108 may also be configured to reset or power up each subsystem independently. The management compute subsystem 108 may also be configured to manage the resources associated with different subsystems. For example, the management compute subsystem 108 may configure dedicated processing and memory resources to each subsystem from a pool of dedicated processing and memory resources for each subsystem. In some embodiments, the management compute subsystem 108 may include its own dedicated processing resources such as one or more processor cores.

According to some embodiments, the network compute subsystem 104 and the server compute subsystem 106 within the SoC 102 can be completely isolated from each other by physically separating the two sub systems. Each subsystem on the SoC 102 may be implemented on a separate reset and/or power domain. In an event if one of the subsystems needs to be reset or powered down, the other subsystem can continue to function without getting affected.

In some embodiments, the SoC 102 may include reset logic (not shown) to be able to independently reset the network compute subsystem 104, server compute subsystem 106 and the management compute subsystem 108. There may be a separate reset line to fully reset the SoC 102. In some embodiments, different subsystems of the SoC 102 may be on different power domains. For example, the network compute subsystem 104 may be on a first power domain, the server compute subsystem 106 may be on a second power domain and the management compute subsystem 108 may be on a third power domain. This may allow different subsystems to be powered up or down independently without affecting other subsystems.

In some embodiments, depending on the work load demand, the host system 110 may offload some of the computing service tasks to the server compute subsystem 106. For example, in some instances, the host system 110 can perform more urgent and/or processing intensive tasks (e.g., tasks that require quick results) and offload less urgent, less critical or less processing intensive tasks to the SoC 102. In some other instances, the host system 110 can offload some low power tasks to the SoC 102 since the power consumption of the servers on the host system 110 may be higher than the power consumption of the server compute subsystem 106.

In some embodiments, the management compute subsystem 108 may determine which computing service tasks may be offloaded to the server compute subsystem 106, for example, based on a software or hardware configuration. In some embodiments, some of the computing service tasks may be tagged for execution by the server compute subsystem 106. For example, the management compute subsystem 108 may identify the computing service tasks that are tagged (e.g., based on a flag or a data field) and forward those tasks to the server compute subsystem 106 for execution.

In some embodiments, an external entity or system may determine which computing service tasks may be performed by the server compute subsystem 106. For example, the external entity or system may communicate with the management compute subsystem 108 over a network connection to identify the tasks that may be performed by the server compute subsystem 106.

Hence, various embodiments can provide additional server compute subsystems inside the server without adding additional power supplies, cooling supplies, networking resources, disc drives, sheet metal, the physical footprint of the server, etc. According to certain embodiments, the additional cost of implementing the server compute subsystem as part of the SoC may be small or minimal compared to adding another server to the infrastructure or even adding another server socket. For example, the cost associated with implementing a server compute subsystem as described herein may be limited to the additional die area for the new server compute subsystem, e.g., processor and memory resources associated with the server compute subsystem.

Figure 2:
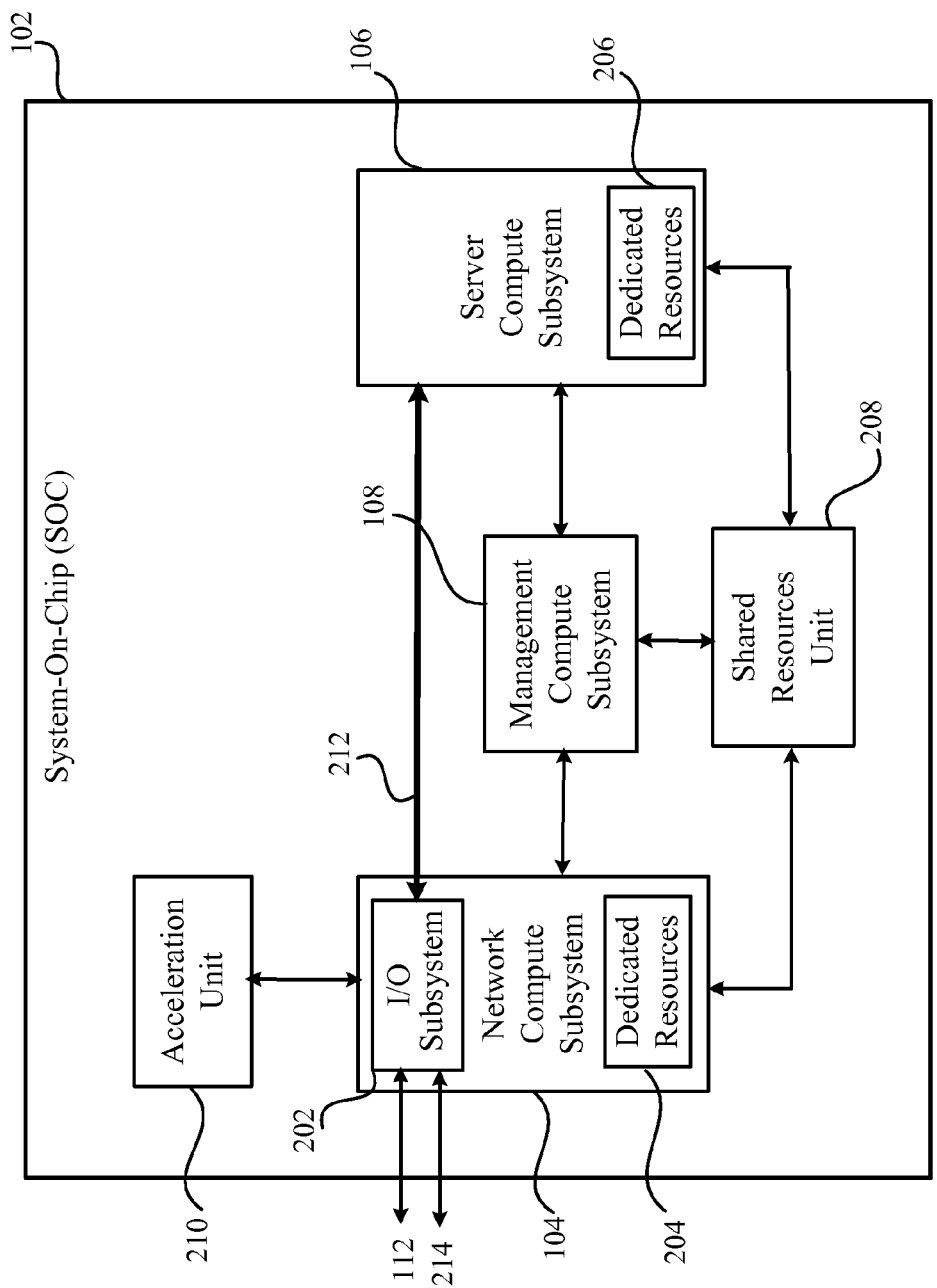
FIG. 2 illustrates a high level block diagram of a system-on-chip (SoC) according to certain embodiments of the disclosure.

FIG. 2 illustrates components of the SoC 102 in more detail according to one embodiment of the disclosed technologies.

The SoC 102 may include an acceleration unit 210 and a shared resources unit 208 in addition to the network compute subsystem 104, the management compute subsystem 108 and the server compute subsystem 106, as discussed with reference to FIG. 1. The network compute subsystem 104 may include an I/O subsystem 202 and dedicated resources 204. The server compute subsystem 106 may include dedicated resources 206. Having separate dedicated resources can allow each subsystem to function independently and avoid jitter or security risks to the client services.

The I/O subsystem 202 may include one or more interfaces for communicating with other subsystems on the SoC 102 and for communicating with the external systems. For example, the I/O subsystem 202 may include a first interface 212 to communicate with the server compute subsystem 106. The I/O subsystem 202 may include a second interface 112 to communicate with the host system 110 as shown in FIG. 1. The interface 212 may be based on a standard interface such as PCIe or any other suitable interface. For example, the I/O subsystem 202 may include a PCIe root complex (RC) device to connect to the PCIe interface of the other subsystems. The I/O subsystem 202 may also include a third interface 214 for network connectivity. In some embodiments, the network compute subsystem 104 and the server compute subsystem 106 may communicate with the network (e.g., the Internet, Intranet) using the interface 214 of the I/O subsystem 202. For example, the interface 214 may be based on a standard such as Ethernet, token ring, Wi-Fi, ATM (Asynchronous Transfer Mode), etc. In some embodiments, the I/O subsystem 202 may also include an interface to connect to external mass storage devices such as hard drives, optical drives, etc. For example, the interface may be based on Serial Advanced Technology Attachment, also known as Serial ATA or SATA.

In some embodiments, the server compute subsystem 106 may utilize the I/O subsystem 202 of the network compute subsystem 104 to communicate with the host system 110. For example, the server compute subsystem 106 may use the network compute subsystem 104 to move the traffic or to perform network functions such as network storage processing, etc. in communication with the host system 110. An SoC comprising only the network compute subsystem can function as a smart network interface controller (NIC) for the host system 110. For example, the network compute subsystem can allow the host system 110 to connect to a network using the I/O subsystem 202. However, according to some embodiments, the SoC 102 may present outward facing smart NIC functionalities for the host system 110 and inward facing smart NIC functionalities for the server compute subsystem 106 on the SoC 102. For example, the outward facing smart NIC functionality can allow the host system 110, the network compute subsystem 104 and the server compute subsystem 106 to connect to a network using the I/O subsystem 202 (e.g., via interface 214). Similarly, the inward facing smart NIC functionality can allow the server compute subsystem 106 to connect to the host system 110 using the I/O subsystem 202 (e.g., via interface 212 and interface 112).

The dedicated resources 204 may include multi-core processors and memory resources for the network compute subsystem 104. A multi-core processor may include multiple processing units within the same processor. The memory resources may include caches, memory controllers, memory, etc. For example, the caches may include cache hierarchies such as Level 1 (L1), Level 2 (L2), and Level 3 (L3) or last-level caches. In some embodiments, the multi-core processors may share certain resources, such as busses and L1 and/or L2 cache between multiple-cores. In some instances, each core in a single or multi-core processor may also include multiple executing logical processors (or threads). In such a core (that supports multiple logical processors), several stages of the execution pipeline and also lower level caches (e.g., L1 or L2) may also be shared. Some of the non-limiting examples of the multi-core processors may include ARM's cortex A57, MIPS, AMD Phenom, Intel ATOM, etc. L1 cache may be used as a primary cache and L2 cache may be used as a secondary cache. In some embodiments, L1 and L2 caches may be built into the processor cores. L3 cache may be on the SoC 102 and may be shared by all the processors for the same subsystem. The memory controllers may include double data rate (DDR) controllers, DDR2 controllers or any suitable controller and may be used to manage the access to an external memory (not shown).

In some embodiments, the dedicated resources 204 may include dedicated processing and memory resources for the network compute subsystem 104 that can be configured at power-on reset from a dedicated pool of processing and memory resources for the network compute subsystem 104. For example, a dedicated pool of processing and memory resources for the network compute subsystem 104 may include eight, 4-core processors and eight, 4 MB L2 caches At power-on reset, the dedicated resources 204 may be configured by assigning six, 4-core processors and six, 4 MB L2 caches to the network compute subsystem 104. In some embodiments, the number of cores for each processor and the size of the L1/L2 cache in the dedicated pool of processing and memory resources may also be configurable. For example, in some instances, at power-on reset, the dedicated resources 204 may be configured by assigning five, 2-core processors and five, 2.5 MB L2 caches to the network compute subsystem 104.

The dedicated resources 206 may include multi-core processors and memory resources for the server compute subsystem 106. The dedicated resources 206 may include one or more processing cores and memory resources. Some of the non-limiting examples of the multi-core processors may include ARM's cortex A57, MIPS, AMD Phenom, Intel ATOM, etc. The memory resources may include caches, memory controllers, etc. For example, the caches may include cache hierarchies such as L1, L2 and L3 or last-level caches. L1 cache may be used as a primary cache and L2 cache may be used as a secondary cache. In some embodiments, L1 and L2 caches may be built into the processor cores. L3 cache may be on the SoC 102 and may be shared by all the processors for the same subsystem. The memory controllers may include DDR controllers, DDR2 controllers or any suitable controller and may be used to manage the access to the external memory (e.g., system memory such as a DRAM).

In some embodiments, the dedicated resources 206 may include dedicated processing and memory resources for the server compute subsystem 106 that can be configured at power-on reset from a dedicated pool of processing and memory resources for the server compute subsystem 106. For example, a dedicated pool of processing and memory resources for the server compute subsystem 106 may include eight, 4-core processors and eight, 4 MB L2 caches At power-on reset, the dedicated resources 206 may be configured by assigning six, 4-core processors and six, 4 MB L2 caches to the server compute subsystem 106. In some embodiments, the number of cores for each processor and the size of the L1/L2 cache in the dedicated pool of processing and memory resources may also be configurable. For example, in some instances, at power-on reset, the dedicated resources 206 may be configured by assigning seven, 3-core processors and seven, 3 MB L2 caches to the server compute subsystem 106.

The acceleration unit 210 may be configured to provide networking acceleration for the network compute subsystem 104. In some embodiments, the acceleration unit 210 may include different types of accelerators such as hardware accelerators, various pipelines, etc. The acceleration unit 210 may also support RDMA (Remote Direct Memory Access), crypto engines, etc. For example, the crypto engine may execute cryptographic functions in hardware, thus reducing software overhead and accelerating the execution of decryption, encryption and authentication functions related to networking. In some embodiments, the acceleration unit 210 may not be accessed by the server compute subsystem 106.

The shared resources unit 208 may include one or more resources that can be shared between the network compute subsystem 104 and the server compute subsystem 106. In some embodiments, the shared resources unit 208 may include one or more peripherals that can be safely shared between the network compute subsystem 104 and the server compute subsystem 106 without causing any jitter or security concerns. For example, the shared resources unit 208 may include a random number generator, an inter-processor communication module, scratchpad memory, flash memory, etc.

Figure 3A:
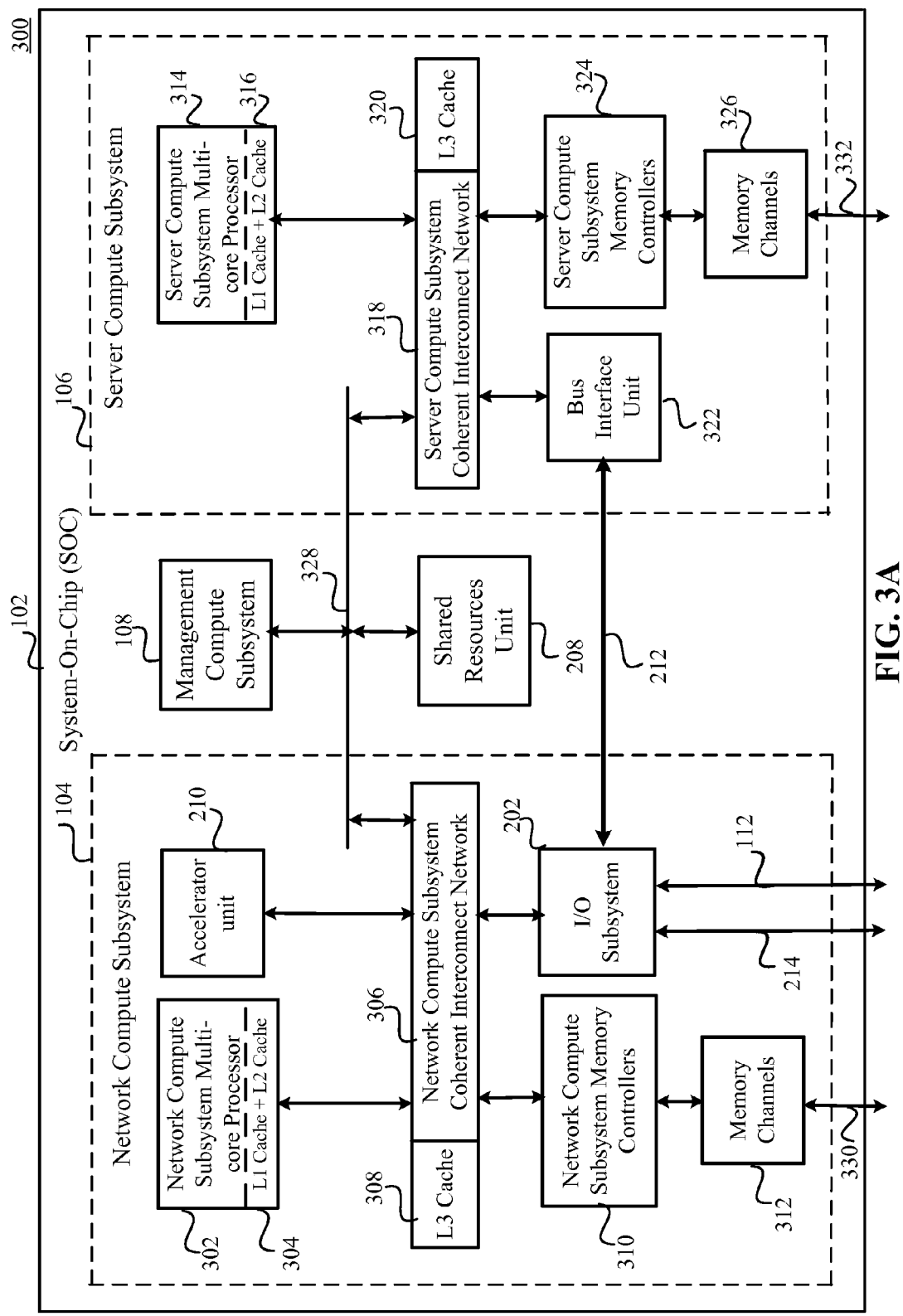
FIG. 3A illustrates a detailed block diagram of the SoC configured to communicate with physically isolated external memory for each compute subsystem according to certain embodiments of the disclosure.

FIG. 3A illustrates a detailed block diagram 300 of the SoC 102 configured to communicate with physically isolated external memory for each compute subsystem in one exemplary embodiment. FIG. 3A illustrates the SoC 102 comprising the network compute subsystem 104 and the server compute subsystem 106 as discussed previously with reference to FIG. 1 and FIG. 2.

The network compute subsystem 104 may include dedicated resources 204 (see FIG. 2) that can include processing resources, e.g., a network compute subsystem multi-core processor 302, and memory resources, e.g., caches 304, an L3 cache 308, network compute subsystem memory controllers 310 and memory channels 312. It will be understood that the dedicated resources 204 may include more or less components than illustrated with reference to FIG. 3A. In some embodiments, the dedicated resources 204 for the network compute subsystem 104 may be assigned from a dedicated pool of processing and memory resources for the network compute subsystem 104.

The network compute subsystem multi-core processor 302 may include multiple processor cores or processing units within the same processor. In certain embodiments, the network compute subsystem multi-core processor 302 may be coupled to caches 304 (e.g., an L1 cache and/or an L2 cache). In some embodiments, the number of dedicated processor cores for the network compute subsystem 104 can be configured by the management compute subsystem 108 at power on reset from a pool of processor cores for the network compute subsystem 104. For example, in one instance, the pool of processor cores may include 32 processor cores that can allow less than or equal to 32 processor cores that can be assigned to the network compute subsystem 104 as dedicated processing resources. In some embodiments, the number of processor cores can be configured to match the needed compute resources to the throughput requirement of the virtual machine instance.

The network compute subsystem multi-core processor 302 may be configured to execute a plurality of instructions collectively on one or more processors of the processor cores. The instructions may be stored on a computer-readable storage medium, for example, in the form of a computer program. The computer-readable storage medium may be non-transitory.

In some embodiments, each processor core may be coupled to an L1 cache and/or an L2 cache. For example, the network compute subsystem multi-core processor 302 may include ARM® Cortex® A57 multiprocessor cores that may each include an L1 instruction cache (e.g., 48 KB) and/or an L1 data cache (e.g., 32 KB) for temporary storage of instructions and data. In some embodiments, the L1 and L2 cache may be implemented using a static random access memory (SRAM). In some embodiments, the dedicated memory resources for the network compute subsystem 104 may be assigned from a dedicated pool of L1 caches, L2 caches, L3 caches, memory controllers, memory channels, etc. for the network compute subsystem 104. For example, in some embodiments, size of the caches 304 (L1/L2 cache) can be configured by the management compute subsystem 108 at power on reset based on maximum available cache sizes. For example, the caches 304 may be configured to have any suitable size that is less than or equal to the maximum available cache for the subsystem (e.g., 4 MB).

In some embodiments, the network compute subsystem multi-core processor 302 may share certain resources, such as busses and a L3 cache between multiple-cores. For example, as shown in FIG. 3A, the L3 cache 308 may be shared by multiple cores of the network compute subsystem multi-core processor 302. In some embodiments, size of the L3 cache 308 can be configured by the management compute subsystem 108 at power on reset based on maximum available L3 cache size. For example, the L3 cache 308 may be configured to have any suitable size that is less than or equal to the maximum available cache (e.g., 32 MB).

Network compute subsystem memory controllers 310 may be configured to control data transfer between the network compute subsystem multi-core processor 302, caches 304 and L3 cache 308, and an external memory (not shown) via memory channels 312. The external memory may include DDR synchronous dynamic random-access memory (DRAM), DDR2 DRAM, DRAM, etc. In some embodiments, the external memory for the network compute subsystem 104 may be physically isolated from the server compute subsystem 106 and may be accessed using the network compute subsystem memory controllers 310 and the memory channels 312 using interface 330. In some embodiments, the network compute subsystem memory controllers 310 may include one or more DDR (Double Data Rate) controllers. The DDR controllers can increase the bandwidth by controlling the flow of data using the memory channels 312. In some embodiments, the number of DDR controllers may be determined based on the number of processor cores, size of caches, etc.

A network compute subsystem coherent interconnect network 306 may be configured to provide coherency among different components of the network compute subsystem 104, e.g., between multiple cores of the network compute subsystem multi-core processor 302, caches 304, L3 cache 308, accelerator unit 210, network compute subsystem memory controllers 310, I/O subsystem 202, management compute subsystem 108 and the shared resources unit 208. In some embodiments, the network compute subsystem coherent interconnect network 306 may be configured to ensure that all shared data is coherent in the network compute subsystem 104. For example, if certain shared data is stored in two or more locations (e.g., multiple processors, caches, etc.), the network compute subsystem coherent interconnect network 306 may be operable to maintain consistency of the shared data in different locations. The network compute subsystem coherent interconnect network 306 may perform software managed coherency, hardware managed coherency or combination of both. For example, the network compute subsystem coherent interconnect network 306 may be configured to maintain coherency based on a coherency protocol such as snooping, directory based, etc. In some embodiments, in snooping based cache coherency, each individual cache (e.g., caches 304, L3 cache 308) can monitor address lines for accesses to memory locations that they have cached. When a write operation is observed to a location that a cache has a copy of, the cache controller invalidates its own copy of the snooped memory location. In some embodiments, directory based coherence may be used to store the shared data in a common directory that can maintain the coherence between different components. In some embodiments, a snoop filter may be used to check for coherency traffic for the network compute subsystem coherent interconnect network 306.

In certain embodiments, the network compute subsystem 104 may be on a separate reset domain. For example, all the components of the network compute subsystem 104 such as the network compute subsystem multi-core processor 302, caches 304, L3 cache 308, network compute subsystem memory controllers 310, I/O subsystem 202 and the memory channels 312 may be reset at the same time. The network compute subsystem 104 may be reset independently without resetting other subsystems (e.g., server compute subsystem 106, management compute subsystem 108, shared resources unit 208, etc.). In some embodiments, the network compute subsystem 104 may be reset by the management compute subsystem 108 or by a full chip reset (e.g., SoC reset). For example, the SoC reset may reset all the subsystems on the SoC 102 including the network compute subsystem 104, server compute subsystem 106, management compute subsystem 108 and the shared resources unit 208. In certain instances, resetting the network compute subsystem 104 may reset the I/O subsystem 202 which can impact the networking traffic for the host system 110 and the server compute subsystem 106.

In certain embodiments, the network compute subsystem 104 may be on a separate power domain. For example, the network compute subsystem 104 may be powered on and off independent of other subsystems. In some embodiments, different components of the network compute subsystem 104 may be on different power domains within the network compute subsystem 104. For example, each core in the network compute subsystem multi-core processor 302 may be on a separate power domain, each core processor cluster with shared L1/L2 cache 304 may be on a power domain, the acceleration unit 210 may be on a power domain, and the I/O subsystem 202 may be a separate power domain. Having separate power domains for different components can allow efficient power management on the SoC 102. For example, in some embodiments, power management may be provided through voltage manipulation, clock manipulation (e.g., clock gating) or any other suitable method to control the power consumption independently for each power domain.

Referring back to FIG. 3A, in certain embodiments, the server compute subsystem 104 may include dedicated resources 206 (see FIG. 2) that can include processor resources, e.g., a server compute subsystem multi-core processor 314, and memory resources, e.g., caches 316, an L3 cache 320, network compute subsystem memory controllers 324 and memory channels 326. It will be understood that the dedicated resources 206 may include more or less components than illustrated with reference to FIG. 3A. In some embodiments, the dedicated resources 206 for the server compute subsystem 106 may be assigned from a dedicated pool of processing and memory resources for the server compute subsystem 106.

The server compute subsystem multi-core processor 314 may include multiple processor cores or processing units within the same processor. In some embodiments, the number of dedicated processor cores for the server compute subsystem 106 can be configured by the management compute subsystem 108 at power on reset from a pool of processor cores for the server compute subsystem 106. For example, in one instance, the pool of processor cores may include 32 processor cores that can allow less than or equal to 32 processor cores that can be assigned to the server compute subsystem 106 as dedicated processing resources. In some embodiments, the number of processor cores can be configured to match the needed compute resources to the throughput requirement of the virtual machine instance.

The server compute subsystem multi-core processor 314 may be configured to execute a plurality of instructions collectively on one or more processors of the processor cores. The instructions may be stored on a computer-readable storage medium, for example, in the form of a computer program. The computer-readable storage medium may be non-transitory.

In some embodiments, each processor core may be coupled to a L1 cache and/or a L2 cache. For example, the server compute subsystem multi-core processor 314 may include ARM® Cortex® A57 multiprocessor cores that may each include an L1 instruction cache (e/g., 48 KB) and/or an L1 data cache (32 KB) for temporary storage of instructions and data. In some embodiments, the L1 and L2 cache may be implemented using a static RAM (SRAM).). In some embodiments, the dedicated memory resources for the server compute subsystem 106 may be assigned from a dedicated pool of L1 caches, L2 caches, L3 caches, memory controllers, memory channels, etc. for the server compute subsystem 106. For example, in some embodiments, size of the caches 316 (L1/L2 cache) can be configured by the management compute subsystem 108 at power on reset based on maximum available cache sizes. For example, the caches 316 may be configured to have any suitable size that is less than or equal to the maximum available cache (e.g., 4 MB).

In some embodiments, the server compute subsystem multi-core processor 314 may share certain resources, such as busses and an L3 cache between multiple-cores. For example, as shown in FIG. 3A, the L3 cache 320 may be shared by multiple cores of the server compute subsystem multi-core processor 314. In some embodiments, size of the L3 cache 320 can be configured by the management compute subsystem 108 at power on reset based on maximum available L3 cache size. For example, the L3 cache 320 may be configured to have any suitable size that is less than or equal to the maximum available cache (e.g., 32 MB).

The server compute subsystem memory controllers 324 may be configured to control data transfer between the server compute subsystem multi-core processor 314, caches 316 and L3 cache 320, and the external memory (not shown) via memory channels 326. In some embodiments, the external memory for the server compute subsystem 106 may be physically isolated from the network compute subsystem 104 and may be accessed using the server compute subsystem memory controllers 324 and the memory channels 326 using interface 332. In some embodiments, the server compute subsystem memory controllers 324 may include one or more DDR controllers. In some embodiments, the number of DDR controllers may be determined based on the number of processor cores, size of caches, etc.

As illustrated in FIG. 3A, the processor and memory resources for network compute subsystem 104 are not shared by the processor and memory resources for the server compute subsystem 106. The two subsystems can compute independent tasks using their own resources without affecting the performance of the other subsystem, thus minimizing jitter and security risks. This can result in high performance compute services provided by the host system 110.

The server compute subsystem 104 may be configured to communicate with the I/O subsystem 202 using a bus interface unit 322. In some embodiments, the bus interface unit 322 may include a PCIe root complex (RC) device to connect to the PCIe bus (e.g., interface 212 to connect to the PCIe of the I/O subsystem 202). In certain embodiments, the bus interface unit 322 may also include an interface to connect to external mass storage devices such as hard drives, optical drives, etc. based on SATA.

The server compute subsystem 104 may be configured to communicate with the host system 110 via the I/O subsystem 202. For example, the server compute subsystem 104 may communicate with the I/O subsystem 202 via the bus interface 212 and the I/O subsystem 202 may communicate with the host system 110 via the bus interface 112. In some embodiments, in an event when the network compute subsystem 104 is powered down, the server compute subsystem 106 may still communicate with the host system 110 using the I/O subsystem 202. For example, the server compute subsystem 106 may be able to route the network traffic and perform network storage processing via the I/O subsystem 202.

A server compute subsystem coherent interconnect network 318 may be configured to provide coherency between multiple cores of the server compute subsystem multi-core processor 314, caches 316, L3 cache 320, server compute subsystem memory controllers 324, bus interface unit 322, management compute subsystem 108 and the shared resources 208. For example, the server compute subsystem coherent interconnect network 318 may ensure that all shared data is coherent in the server compute subsystem 106. The server compute subsystem coherent interconnect network 318 may perform software managed coherency, hardware managed coherency or combination of both. For example, the server compute subsystem coherent interconnect network 318 may be configured to maintain coherency based on a coherency protocol such as snooping, directory based, etc. In some embodiments, in snooping based cache coherency, each individual cache (e.g., caches 316, L3 cache 320) can monitor address lines for accesses to memory locations that they have cached. When a write operation is observed to a location that a cache has a copy of, the cache controller invalidates its own copy of the snooped memory location. In some embodiments, directory based coherence may be used to store the shared data in a common directory that can maintain the coherence between different components. In some embodiments, a snoop filter may be used to check for coherency traffic for the server compute subsystem coherent interconnect network 318.

In certain embodiments, the server compute subsystem 106 may be on a separate reset domain. For example, all the components of the server compute subsystem 106 such as the server compute subsystem multi-core processor 314, caches 316, L3 cache 320, server compute subsystem memory controllers 324, and the memory channels 326 may be reset at the same time. The server compute subsystem 106 may be reset independently without resetting other subsystems (e.g., network compute subsystem 104, management compute subsystem 108, shared resources unit 208, etc.). In some embodiments, the server compute subsystem 106 may be reset by the management compute subsystem 108 or by a full chip reset (e.g., SoC reset). For example, the SoC reset may reset all the subsystems on the SoC 102 including the network compute subsystem 104, server compute subsystem 106, management compute subsystem 108 and the shared resources unit 208. In certain embodiments, resetting the server compute subsystem 106 may not impact the functionality of the host system 110 and the network compute subsystem 104.

In certain embodiments, the server compute subsystem 106 may be on a separate power domain. For example, the server compute subsystem 106 may be powered on and off independent of other subsystems. In some embodiments, some or all the components of the server compute subsystem 106 may be on different power domains within the server compute subsystem 106. For example, each core in the server compute subsystem multi-core processor 314 may be on a separate power domain and each core processor cluster with shared L1/L2 cache 316 may be on a separate power domain, and so on. Having separate power domains for different components can allow independent control of each power domain thus providing the flexibility to control the overall power consumption of the SoC 102.

In some embodiments, the management compute subsystem 108 and the shared resources unit 208 may communicate with the network compute subsystem 104 using an internal bus 328 that may be communicatively coupled to the network compute subsystem coherent interconnect network 306. Similarly, the management compute subsystem 108 and the shared resources unit 208 may communicate with the server compute subsystem 106 using the internal bus 328 that may be communicatively coupled to the server compute subsystem coherent interconnect network 318.

Figure 3B:
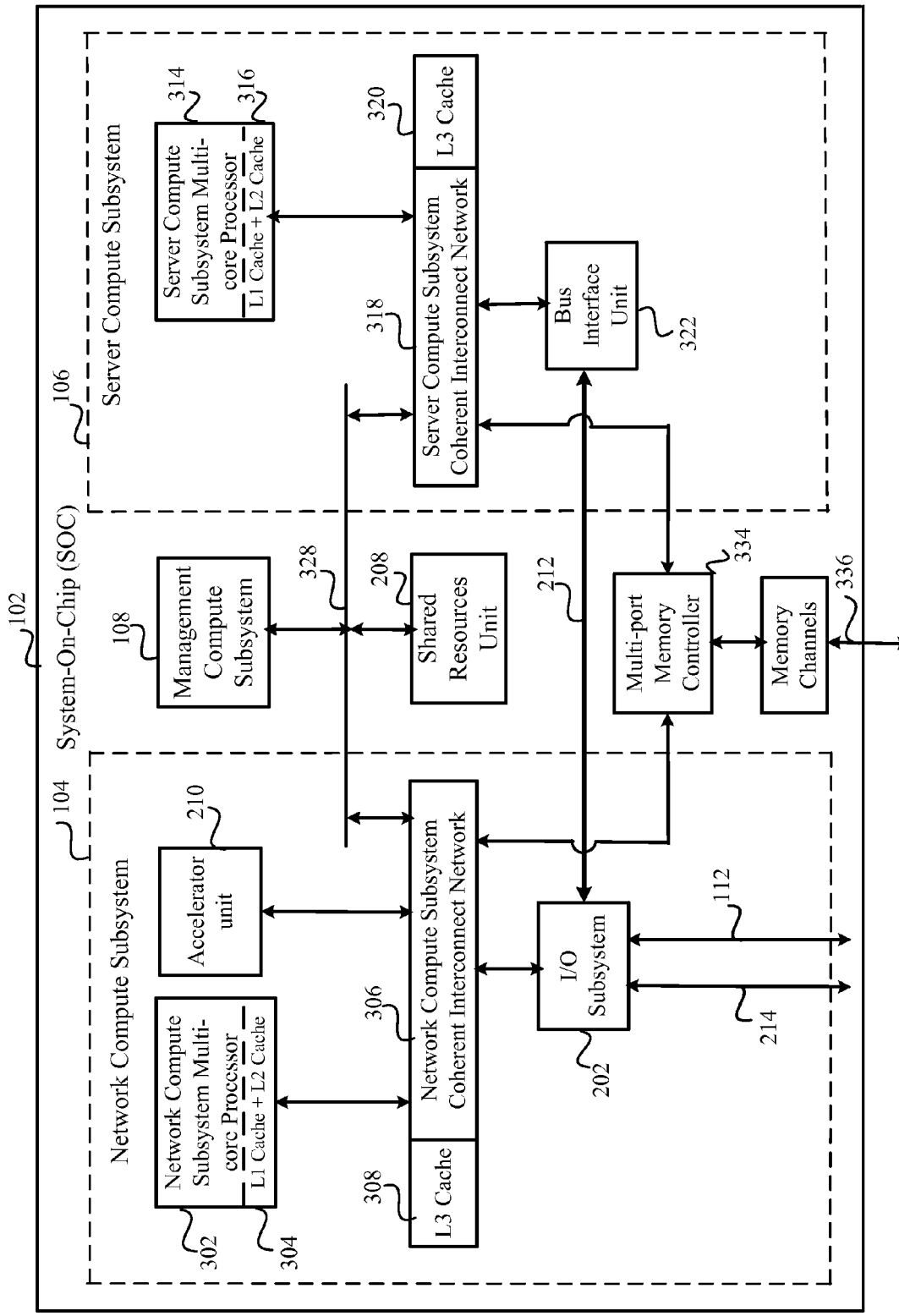
FIG. 3B illustrates a detailed block diagram of the SoC configured to communicate with logically isolated external memory for each compute subsystem according to certain embodiments of the disclosure.

FIG. 3B illustrates a detailed block diagram of the SoC 102 configured to communicate with logically isolated external memory for each compute subsystem according to certain embodiments of the disclosure. FIG. 3B includes a multi-port memory controller 334 and memory channels 336 in place of dedicated memory controllers and memory channels for each compute subsystem as discussed with reference to FIG. 3A, e.g., the network compute subsystem memory controllers 310 and memory channels 312 for the network compute subsystem 104 and the server compute subsystem memory controllers 324 and memory channels 326 for the server compute subsystem 106 as shown in FIG. 3A. The multi-port memory controller 334 may be communicatively coupled to the network compute subsystem coherent interconnect network 306 and to the server compute subsystem coherent interconnect network 318.

In some embodiments, the multi-port memory controller 334 and the memory channels 336 can allow the SoC 102 to communicate with an external memory (e.g., DRAM, SDRAM, DDR, DDR2 memory) that is logically isolated for different compute subsystems. For example, the multi-port memory controller 334 may be configured to allow the network compute subsystem 104 to communicate with the external memory on a first port and allow the server compute subsystem 106 to communicate with the external memory on a second port. In some embodiments, the multi-port memory controller 334 may be configured to perform arbitration of memory accesses between the network compute subsystem 104 and the server compute subsystem 106. The external memory may be software partitioned to include logically isolated memories for the network compute subsystem 104 and for the server compute subsystem 106.

Figure 4:
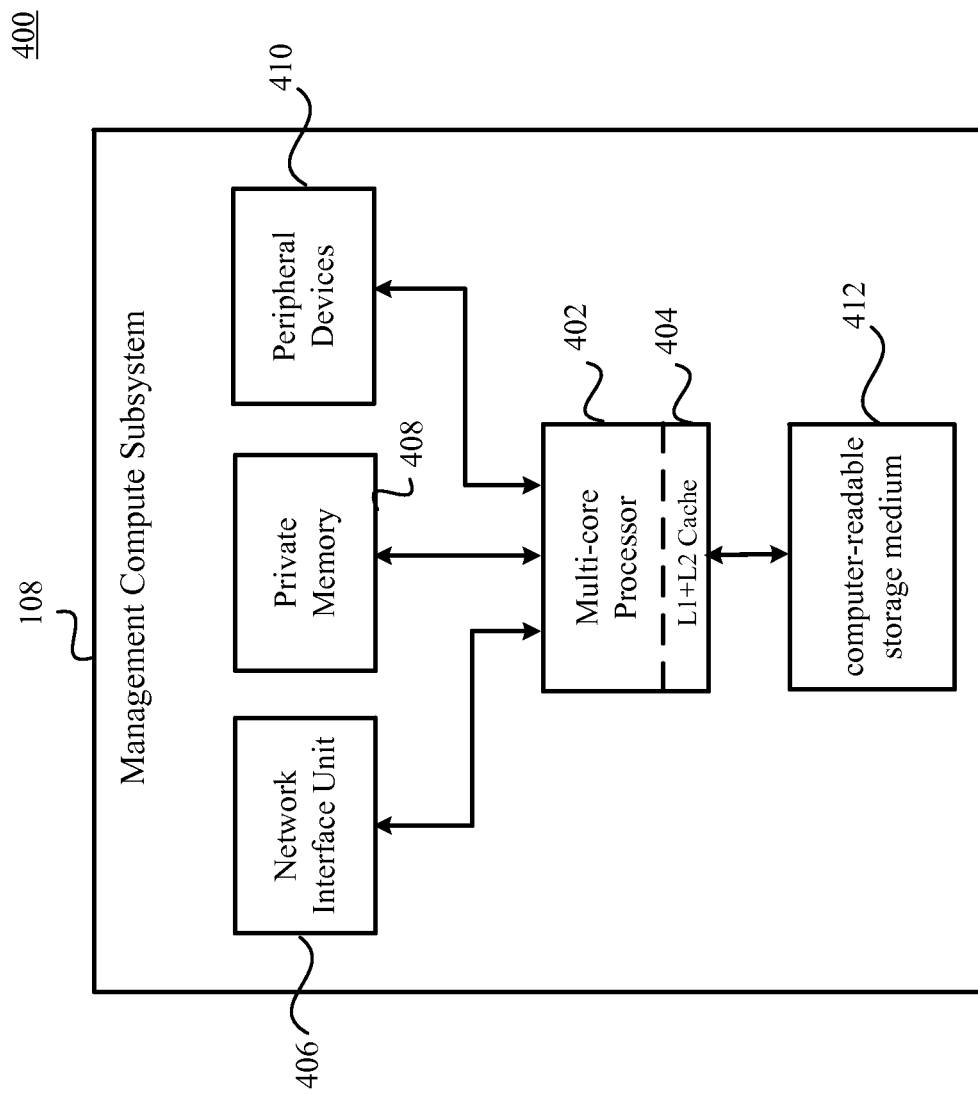
FIG. 4 illustrates a block diagram of the management compute subsystem according to certain embodiments of the disclosure.

FIG. 4 illustrates a block diagram for the management compute subsystem 108, according to certain embodiments. The management compute subsystem 108 may include a multi-core processor 402, an L1/L2 cache 404, a network interface unit 406, private memory 408, peripheral devices 410 and a computer-readable storage medium 412.

The multi-core processor 402 may include one or more processor cores such as A57 by ARM®. The L1/L2 cache 404 may be internal or external to the multi-core processor 402. The multi-core processor 402 may be configured to execute a plurality of instructions that may be stored on the computer-readable storage medium 412. The computer-readable storage medium 412 may be non-transitory. In some embodiments, the computer-readable storage media may include but are not limited to, parameter random access memory (PRAM), SRAM, DRAM, RAM, read only memory (ROM), electrically erasable programmable read-only memory (EEPROM), flash memory or other memory technology, compact disc (CD)-ROM, digital video disk (DVD) or other optical storage, magnetic cassettes, magnetic tape, magnetic disk storage or other magnetic storage devices, or any other medium which can be used to store the desired information and which can be accessed by multi-core processor 402. In some embodiments, the computer-readable storage medium 412 may be part of the peripheral devices 410. The L1/L2 cache 404 may include a data cache for temporary storage of data.

The network interface unit 406 may allow the management compute subsystem 108 to connect to a network. For example, the network interface unit 406 may include an Ethernet MAC (Medium Access Control) that can enable the management compute subsystem 108 to connect to a network such as the Ethernet. In some instances, the Ethernet MAC may provide an Ethernet port to interface to a PHY (physical layer) device for connecting to a network. In some embodiments, an external entity or system may communicate with the management compute subsystem 108 over the network connection to determine which computing service tasks may be performed by the server compute subsystem 106. In some embodiments, the management compute subsystem 108 can communicate with an external entity or system over the network to determine the work load of a virtual machine in order to configure the processing and memory resources after power-on reset.

The private memory 408 may include memory for private use of the management compute subsystem 108. The private memory 408 may include volatile memory such as random access memory (e.g., SRAM or DRAM). For example, the management compute subsystem 108 may use the private memory 408 for temporary storage of data.

The peripheral devices 410 may include private peripheral devices for the management compute subsystem 108. In some embodiments, some of the private peripheral devices 410 may include devices for reboot and power management of different subsystems of the SoC 102, general purpose inputs/outputs, universal asynchronous receivers/transmitters, etc. For example, the peripheral devices 410 may include a trusted management module including boot firmware that can execute at power-on to establish a root-of-trust before powering on other subsystems. In some embodiments, power management may be provided through voltage manipulation, clock manipulation or any other suitable method. In some embodiments, some of the peripheral devices 410 may provide power management to control power domains for each subsystem on the SoC 102 that may allow each subsystem or some of its components to be powered on and off independently of the others.

In some embodiments, the management compute subsystem 108 may be configured to be the first to run upon a cold power on of the entire SoC 102. In some instances, the management compute subsystem 108 may be powered on first to establish a root-of-trust for the other subsystems before they are powered on. For example, the boot processes for the network compute subsystem 104 and the server compute subsystem 106 may be considered hierarchically under the core boot for the management compute subsystem 108. In some embodiments, the software that would subsequently run on the network compute subsystem 104 and the server compute subsystem 106 may have been authenticated by the management compute subsystem 108 as having been signed using a private key associated with the host system 110 or a particular service provided by the host system 110. This can allow both the network compute subsystem 104 and the server compute subsystem 106 processes to boot via trusted and independent boot loaders.

In some embodiments, the management compute subsystem 108 may be reset/rebooted with a separate reset line without affecting the live operation of both the network compute subsystem 104 and the server compute subsystem 106.

Figure 5:
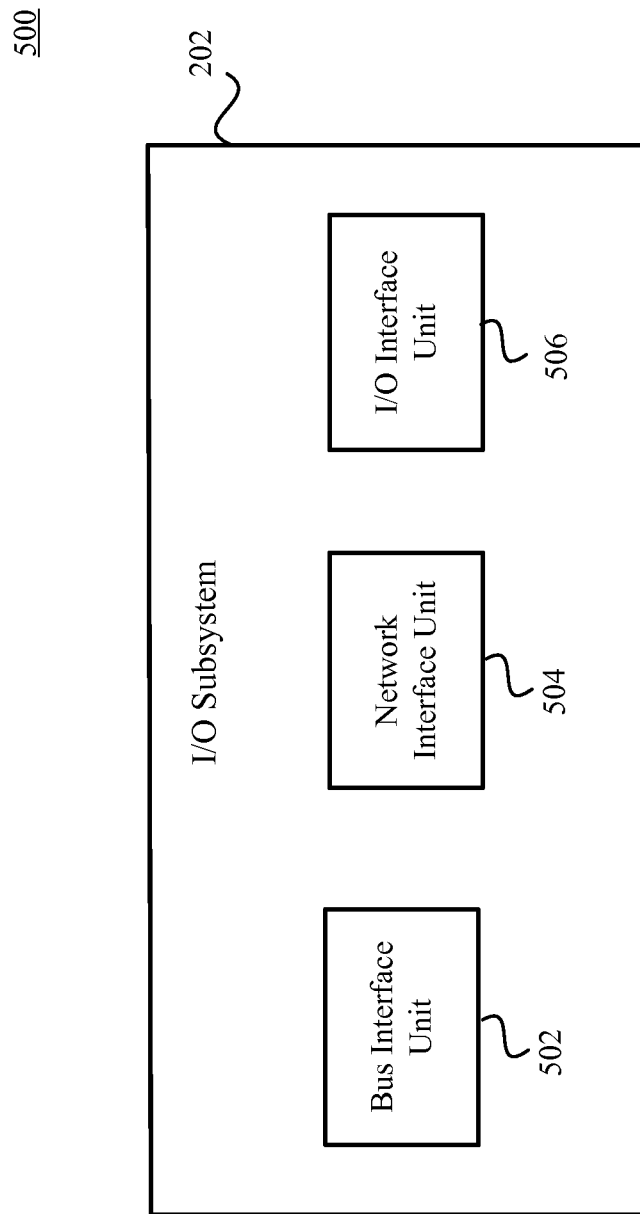
FIG. 5 illustrates a block diagram of the I/O subsystem according to certain embodiments of the disclosure.

FIG. 5 illustrates some components of the I/O subsystem 202. The I/O subsystem 202 may include a bus interface unit 502, a network interface unit 504 and an I/O interface unit 506.

The bus interface unit 502 may include one or more bus interfaces for communication with internal or external components. For example, the bus interface unit 502 may include a first interface to connect with the server compute subsystem 106 and a second interface to connect with the host system 110. In some embodiments, the first interface and the second interface may be PCIe interfaces. For example, the bus interface unit 502 may include one or more PCIe ports to connect to other PCIe ports. The bus interface unit 502 may include a Root Complex (RC) port and an EndPoint port (EP). Referring back to FIG. 3A, the network compute subsystem 104 may communicate with the server compute subsystem 106 via a PCIe port in the I/O subsystem 202 and a PCIe port in the bus interface unit 322. Similarly, referring back to FIG. 1, the network compute subsystem 104 may communicate with the host system 110 via a PCIe port in the I/O subsystem 202 and a PCIe port in the host system 110.

The network interface unit 504 may include an interface to connect to a network, for example, the interface 214 as discussed with reference to FIG. 2. In some embodiments, the network interface unit 504 may include one or more Ethernet MACs (e.g., 10/25/40/50 Gb/sec) to connect to an Ethernet network. In some instances, the Ethernet MACs may provide Ethernet ports to interface to a PHY (physical layer) device for connecting to a network. Referring back to FIG. 3A, the one or more Ethernet MACs may connect to the network compute subsystem coherent interconnect network 306.

The I/O interface unit 506 may include one or more interfaces for I/O connectivity. For example, the I/O interface unit 506 may be configured to interface with pins or interconnects for network connectivity (e.g., Ethernet, etc.) and for the external bus interface (e.g., PCIe). In some embodiments, the I/O interface unit 506 may include I/O multiplexers to select one or more input/output signals. In some embodiments, the I/O multiplexers may include a SERDES (Serialize-De-serialize) interface for the I/O.

Figure 6:
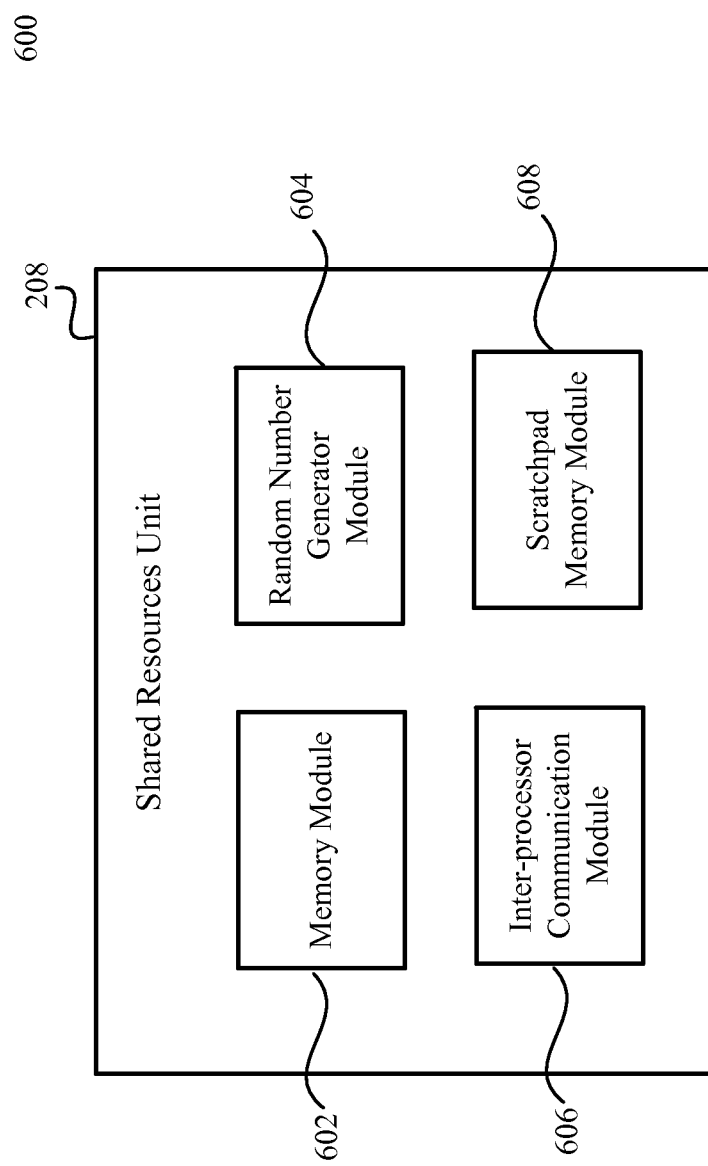
FIG. 6 illustrates a block diagram of the shared resources unit according to certain embodiments of the disclosure.

FIG. 6 illustrates some components of the shared resources unit 208. In particular embodiments, the shared resources unit 208 may include components that may be shared by the two subsystems without causing jitter, e.g., components that do not include process states. The shared resources unit 208 may include a memory module 602, a random generator module 604, an inter-processor communication module 606 and a scratchpad memory module 608.

The memory module 602 may include non-volatile memory storage such as flash memory. For example, the memory module 602 may include an embedded multi-media controller (eMMC) or secure digital (SD) to provide low level flash memory management. In some embodiments, the memory module 602 may be used to store control code e.g., BIOS (Basic Input/Output System), boot loader, etc. For example, the memory module 602 may include code that may be shared by both the subsystems.

The random generator module 604 may be configured to generate a random sequence of numbers or symbols. For example, the random numbers may be used for cryptographic applications such as encryption of data or any such applications. In some embodiments, the random generator module 604 may be used to generate a random number or sequence that may be used by the management compute subsystem 108 for authentication of each subsystem before powering up each subsystem after power on or reboot.

The inter-processor communication module 606 may be used to facilitate communication among different processes associated with the two subsystems. For example, the inter-processor communication module 606 may be used as a communication mailbox for exchange of data for various functions such as message passing, synchronization, shared memory and remote procedure calls (RPC).

The scratchpad memory module 608 may be used for temporary storage of data that may be used by both the subsystems. In some embodiments, the scratchpad memory module 608 may include a high speed memory (e.g., 2 MB SRAM) to store small amounts of data for rapid retrieval, e.g., instructions or intermediate values.

Figure 7:
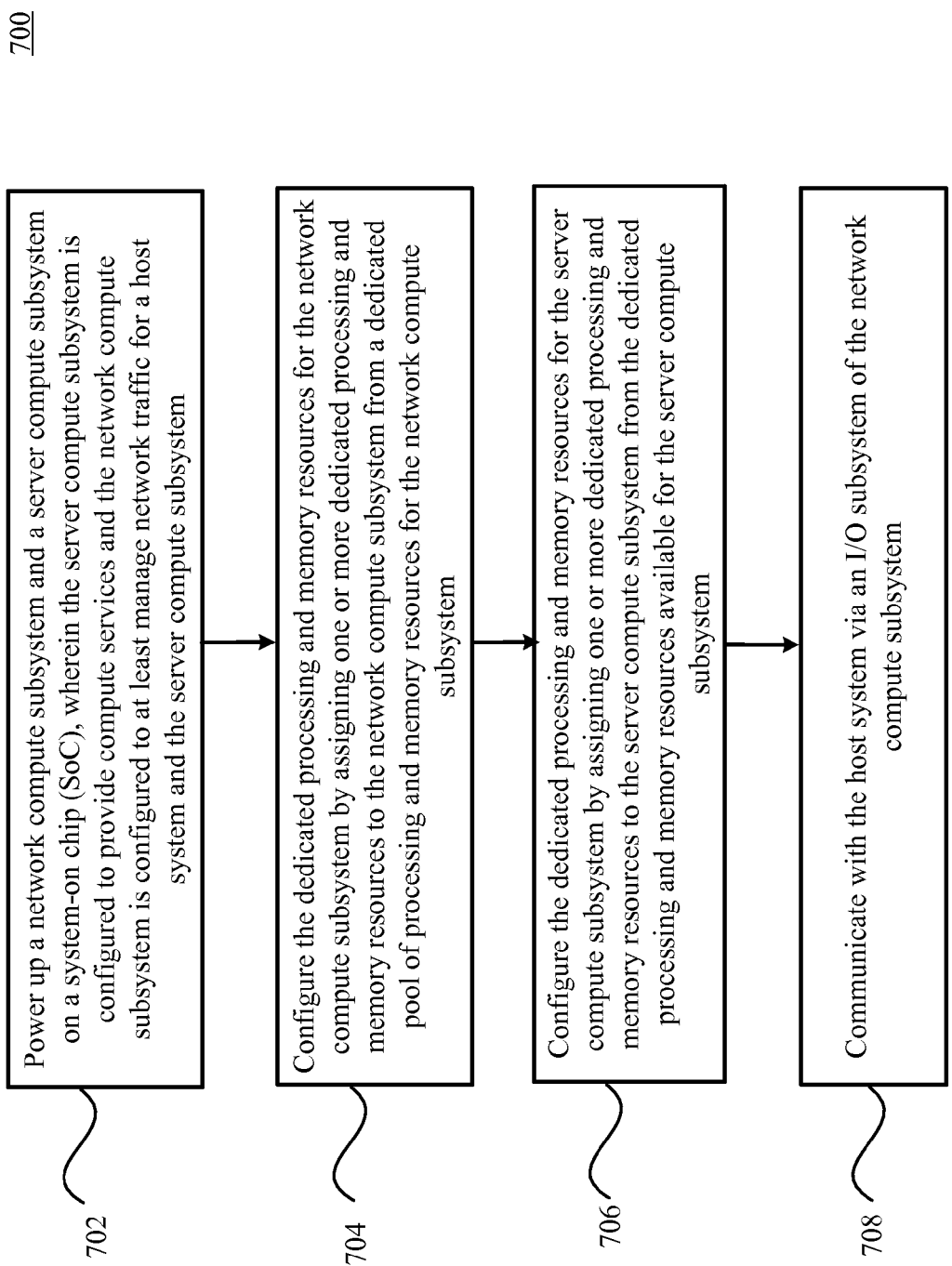
FIG. 7 illustrates a flow diagram according to certain embodiments of the disclosure.

[FIG. 7 illustrates an example method for configuring and booting up the SoC.]

FIG. 7 illustrates a flow diagram 700 according to one or more aspects of the disclosed embodiments. Some or all of the process 700 (or any other processes described herein, or variations and/or combinations thereof) may be performed under the control of one or more computer systems configured with executable instructions and may be implemented as code (e.g., firmware, executable instructions, one or more computer programs or one or more applications) executing collectively on one or more processors, or by hardware or combinations thereof. The code may be stored on a computer-readable storage medium, for example, in the form of a computer program that may include a plurality of instructions executable by one or more processors. The computer-readable storage medium may be non-transitory.

At step 702, the network compute subsystem 104 and the server compute subsystem 106 may be powered up. For example, the management compute subsystem 108 may power up the network compute subsystem 104 and the server compute subsystem 106. The network compute subsystem 104 may be on a first power domain and the server compute subsystem 106 may be on a second power domain. In some embodiments, the management compute subsystem 108 may be powered up first to establish a root-of-trust for the network compute subsystem 104 and the server compute subsystem 106 before they are powered on. For example, the management compute subsystem 108 may execute boot firmware at power-on to establish a root-of-trust. In some embodiments, the boot processes for the network compute subsystem 104 and the server compute subsystem 106 may be considered hierarchically under the core boot for the management compute subsystem 108. In some embodiments, the software that would subsequently run on the network compute subsystem 104 and the server compute subsystem 106 may have been authenticated by the management compute subsystem 108 as having been signed using a private key associated with the host system 110 or a particular service provided by the host system 110. This can allow both the network compute subsystem 104 and the server compute subsystem 106 processes to boot via trusted and independent boot loaders.

At step 704, the management compute subsystem 108 may configure the processing and memory resources for the network compute subsystem 104 by assigning one or more dedicated processing and memory resources to the network compute subsystem 104 from a dedicated pool of processing and memory resources for the network compute subsystem 104. In some embodiments, the management compute subsystem 108 may be configured to determine the configuration of the processing and memory resources for the network compute subsystem 104 based on a software or hardware configuration. For example, the management compute subsystem 108 may check a software register or the state of one or more pins of the SoC 102 to determine various configurations. For example, referring back to FIG. 3A, the management compute subsystem 108 may determine that the network compute subsystem 104 may include 16-core processor the L2 cache 304 may be 2 MB, and the L3 cache 308 may be 16 MB. The management compute subsystem 108 may also determine the number of network compute subsystem memory controllers 310 and the memory channels 312 for the network compute subsystem 104 based on the processor and memory capacity of the network compute subsystem 104.

At step 706, the management compute subsystem 108 may configure the processing and memory resources for the server compute subsystem 106 by assigning one or more dedicated processing and memory resources to the server compute subsystem 106 from a dedicated pool of processing and memory resources for the server compute subsystem 106. In some embodiments, the management compute subsystem 108 may be configured to determine the configuration of the processing and memory resources for the server compute subsystem 106 based on a software or hardware configuration. For example, the management compute subsystem 108 may check a software register or the state of one or more pins of the SoC 102 to determine various configurations. For example, referring back to FIG. 3A, the management compute subsystem 108 may determine that the server compute subsystem 106 may include 24-core processor, the L2 cache 316 may be 4 MB and the L3 cache 320 may be 24 MB. The management compute subsystem 108 may also determine the number of server compute subsystem memory controllers 324 and the memory channels 326 for the server compute subsystem 106 based on the processor and memory capacity of the server compute subsystem 106.

At step 708, the server compute subsystem 106 may communicate with the host system 110 via the I/O subsystem 202 of the network compute subsystem 104. For example, referring back to FIG. 3A, the server compute subsystem 106 may communicate with the I/O subsystem 202 using the bus interface 212. The I/O subsystem 202 may further communicate with the host system 110 using the interface 112. In some embodiments, the server compute subsystem 106 can communicate with the network via the I/O subsystem 202, for example, using the interface 214.

At least some embodiments can provide additional servers at minimal cost by providing instances of server compute subsystems on a SoC. The SoC may comprise multiple compute subsystems where each compute subsystem can have dedicated processing and memory resources. Each compute subsystem can be powered on or reset separately. Further, having dedicated resources can allow each compute subsystem to function independently without affecting other compute subsystem's performance, thus minimizing jitter and security risks.

Figure 8:
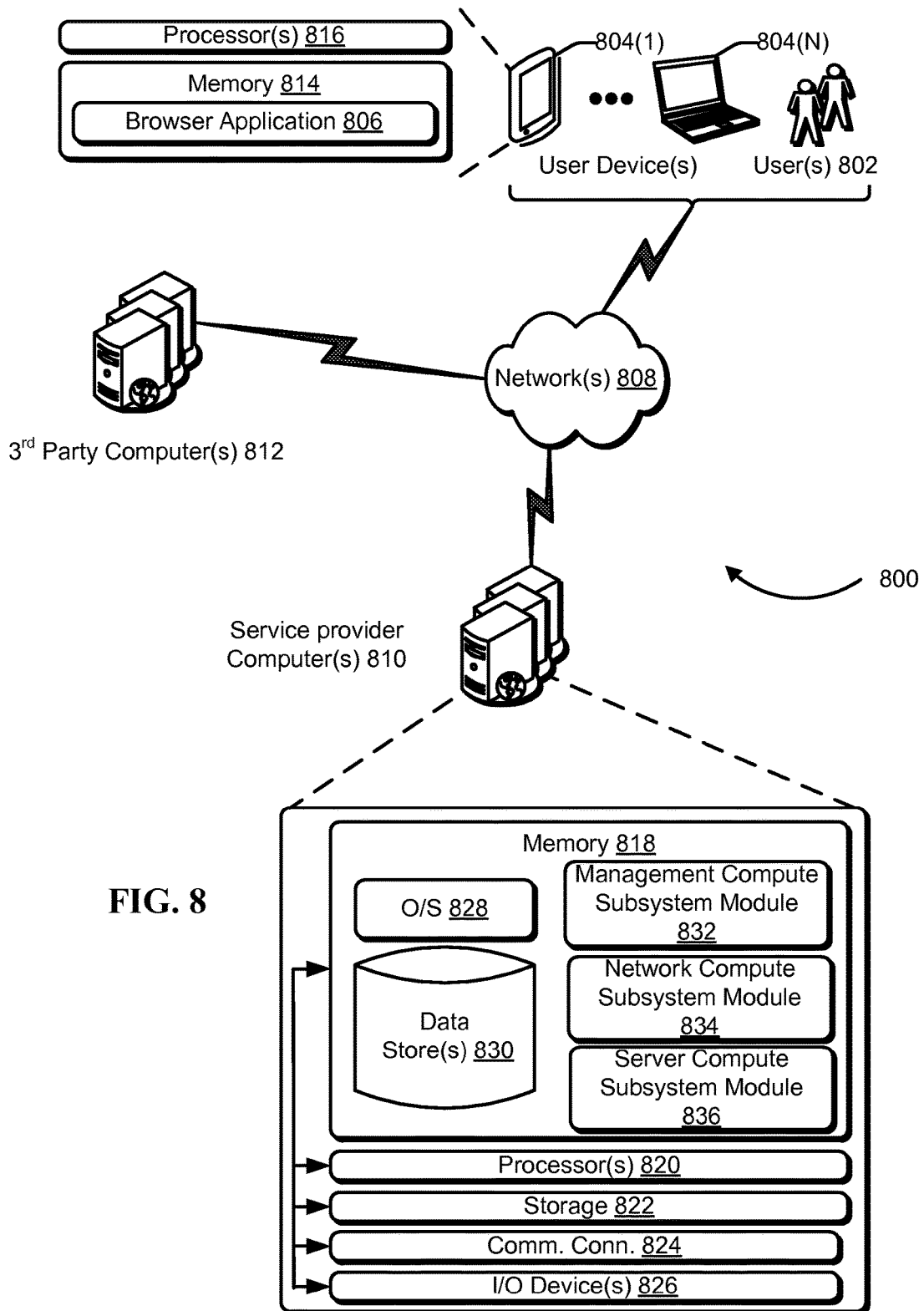
FIG. 8 illustrates an exemplary architecture for features and systems described herein that includes one or more service provider computers and/or a user device connected via one or more networks, according to at least one exemplary embodiment.
Figure 9:
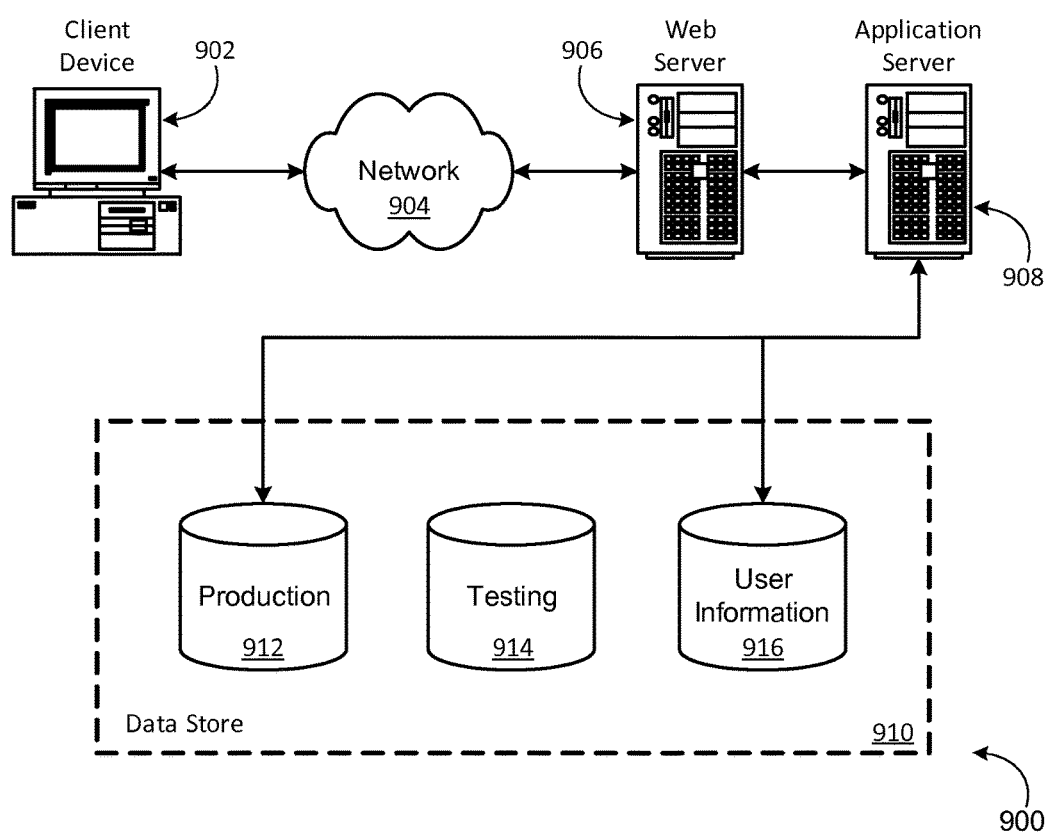
FIG. 9 illustrates an environment in which various embodiments can be implemented.

[FIG. 8 and FIG. 9 illustrate examples of an environment wherein embodiments of the invention can be practiced, and the following section has been reviewed in other applications such that you can skim this section if desired. Please keep in mind when reviewing the application that we want to cover aspects as they might apply in various situations, not just your implementation.]

FIG. 8 illustrates an exemplary architecture for features and systems described herein that includes one or more service provider computers and/or a user device connected via one or more networks, according to at least one exemplary embodiment. The devices discussed in FIGS. 1-7, may use one or more components of the computing devices described in FIG. 8 or may represent one or more computing devices described in FIG. 8. In architecture 800, one or more users 802 may utilize user computing devices 804(1)-(N) (collectively, user devices 804) to access application 806 (e.g., a web browser or mobile device application), via one or more networks 808. In some aspects, application 806 may be hosted, managed and/or provided by a computing resources service or service provider. One or more service provider computers 810 may provide a native application which is configured to run on user devices 804 which user(s) 802 may interact with. Service provider computer(s) 810 may, in some examples, provide computing resources such as, but not limited to, client entities, low latency data storage, durable data storage, data access, management, virtualization, cloud-based software solutions, electronic content performance management, etc. Service provider computer(s) 810 may also be operable to provide web hosting, computer application development and/or implementation platforms, combinations of the foregoing or the like to user(s) 802. Service provider computer(s) 810, in some examples, may communicate with one or more third party computers 812.

In some examples, network(s) 808 may include any one or a combination of many different types of networks, such as cable networks, the Internet, wireless networks, cellular networks and other private and/or public networks. While the illustrated example represents user(s) 802 accessing application 806 over network(s) 808, the described techniques may equally apply in instances where user(s) 802 interact with service provider computer(s) 810 via user device(s) 804 over a landline phone, via a kiosk or in any other manner. It is also noted that the described techniques may apply in other client/server arrangements (e.g., set-top boxes, etc.), as well as in non-client/server arrangements (e.g., locally stored applications, etc.).

As described briefly above, application 806 may allow user(s) 802 to interact with service provider computer(s) 810 such as to access web content (e.g., web pages, music, video, etc.). Service provider computer(s) 810, perhaps arranged in a cluster of servers or as a server farm, may host application 806 and/or cloud-based software services. Other server architectures may also be used to host application 806. Application 806 may be capable of handling requests from many users 802 and serving, in response, various item web pages. Application 806 can provide any type of website that supports user interaction, including social networking sites, online retailers, informational sites, blog sites, search engine sites, news and entertainment sites and so forth. As discussed above, the described techniques can similarly be implemented outside of application 806, such as with other applications running on user device(s) 804.

User device(s) 804 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, user device(s) 804 may be in communication with service provider computer(s) 810 via network(s) 808, or via other network connections. Additionally, user device(s) 804 may be part of the distributed system managed by, controlled by or otherwise part of service provider computer(s) 810 (e.g., a console device integrated with service provider computers 810).

In one illustrative configuration, user device(s) 804 may include at least one memory 814 and one or more processing units (or processor(s)) 816. Processor(s) 816 may be implemented as appropriate in hardware, computer-executable instructions, firmware, or combinations thereof. Computer-executable instruction or firmware implementations of processor(s) 816 may include computer-executable or machine-executable instructions written in any suitable programming language to perform the various functions described. User device(s) 804 may also include geo-location devices (e.g., a global positioning system (GPS) device or the like) for providing and/or recording geographic location information associated with user device(s) 804.

Memory 814 may store program instructions that are loadable and executable on processor(s) 816, as well as data generated during the execution of these programs. Depending on the configuration and type of user device(s) 804, memory 814 may be volatile (such as random access memory (RAM)) and/or non-volatile (such as read-only memory (ROM), flash memory, etc.). User device(s) 804 may also include additional removable storage and/or non-removable storage including, but not limited to, magnetic storage, optical disks and/or tape storage. The disk drives and their associated computer-readable media may provide non-volatile storage of computer-readable instructions, data structures, program modules and other data for the computing devices. In some implementations, memory 814 may include multiple different types of memory, such as static random access memory (SRAM), dynamic random access memory (DRAM), or ROM.

Turning to the contents of memory 814 in more detail, memory 814 may include an operating system and one or more application programs or services for implementing the features disclosed herein including at least a user provided input element or electronic service web page, such as via browser application 806 or dedicated applications (e.g., smart phone applications, tablet applications, etc.). Browser application 806 may be configured to receive, store and/or display a website or other interface for interacting with service provider computer(s) 810. Additionally, memory 814 may store access credentials and/or other user information such as, but not limited to, user IDs, passwords and/or other user information. In some examples, the user information may include information for authenticating an account access request such as, but not limited to, a device ID, a cookie, an IP address, a location or the like. In addition, the user information may include a user-provided response to a security question or a geographic location obtained by the user device 804.

In some aspects, service provider computer(s) 810 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, service provider computer(s) 810 are executed by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, service provider computer(s) 810 may be in communication with user device(s) 804 and/or other service providers via network(s) 808, or via other network connections. Service provider computer(s) 810 may include one or more servers, perhaps arranged in a cluster, as a server farm, or as individual servers not associated with one another. These servers may be configured to implement the keyword classification and rating feature services described herein as part of an integrated, distributed computing environment.

In one illustrative configuration, service provider computer(s) 810 may include at least one memory 818 and one or more processing units (or processor(s)) 820. Processor(s) 820 may be implemented as appropriate in hardware, computer-executable instructions, firmware or combinations thereof. Computer-executable instruction or firmware implementations of processor(s) 820 may include computer-executable or machine-executable instructions written in any suitable programming language to perform the various functions described.

In some instances, hardware processor(s) 820 may be a single core processor or a multi-core processor. A multi-core processor may include multiple processing units within the same processor. In some embodiments, the multi-core processors may share certain resources, such as busses and second or third level of cache between multiple-cores. In some instances, each core in a single or multi-core processor may also include multiple executing logical processors (or threads). In such a core (that supports multiple logical processors), several stages of the execution pipeline and also lower level caches may also be shared.

Memory 818 may store program instructions that are loadable and executable on processor(s) 820, as well as data generated during the execution of these programs. Depending on the configuration and type of service provider computer(s) 810, memory 818 may be volatile (such as RAM) and/or non-volatile (such as ROM, flash memory, etc.). Service provider computer(s) 810 or servers may also include additional storage 822, which may include removable storage and/or non-removable storage. The additional storage 822 may include, but is not limited to, magnetic storage, optical disks and/or tape storage. The disk drives and their associated computer-readable media may provide non-volatile storage of computer-readable instructions, data structures, program modules and other data for the computing devices. In some implementations, memory 818 may include multiple different types of memory, such as SRAM, DRAM, or ROM.

Memory 818, the additional storage 822, both removable and non-removable are all examples of computer-readable storage media. For example, computer-readable storage media may include volatile or non-volatile, removable or non-removable media implemented in any method or technology for storage of information such as computer-readable instructions, data structures, program modules or other data. Memory 818 and the additional storage 822 are all examples of computer storage media. Additional types of computer storage media that may be present in service provider computer(s) 810 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by service provider computer(s) 810. Combinations of any of the above should also be included within the scope of computer-readable media.

Alternatively, computer-readable communication media may include computer-readable instructions, program modules or other data transmitted within a data signal, such as a carrier wave or other transmission. However, as used herein, computer-readable storage media does not include computer-readable communication media.

Service provider computer(s) 810 may also contain communications connection(s) 824 that allow service provider computer(s) 810 to communicate with a stored database, another computing device or server, user terminals and/or other devices on network(s) 808. Service provider computer(s) 810 may also include I/O device(s) 826, such as a keyboard, a mouse, a pen, a voice input device, a touch input device, a display, speakers, a printer and the like.

Memory 818 may include an operating system 828, one or more data stores 830 and/or one or more application programs or services for implementing the features disclosed herein, including optionally a management compute subsystem module 832, a network compute subsystem module 834 and a server compute subsystem module 836. The modules described herein may be software modules, hardware modules or a suitable combination thereof. If the modules are software modules, the modules can be embodied on a non-transitory computer readable medium and processed by a processor in any of the computer systems described herein. In some embodiments, referring back to FIG. 1, the management compute subsystem module 832 can include the functionalities of the management compute subsystem 108, the network compute subsystem module 834 can include the functionalities of the network compute subsystem 104 and the server compute subsystem module 836 can include the functionalities of the server compute subsystem 106. It should be noted that the described processes and architectures can be performed either in real-time or in an asynchronous mode prior to any user interaction. The modules may be configured in the manner suggested in FIG. 8, and/or functions described herein can be provided by one or more modules that exist as separate modules and/or module functions described herein can be spread over multiple modules.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A system on a chip (SoC) configured to communicate with a host system, the SoC comprising:
- a server compute subsystem for providing compute services for the host system, wherein the host system operates as a server that provides compute services to a client through a network, and wherein the compute services provided for the host system include services provided to the client in connection with offloading of compute service tasks from the host system to the server compute subsystem, the server compute subsystem comprising a first set of dedicated processing resources and memory resources, the first set of dedicated processing resources comprising a first processor core configured to execute instructions for providing the compute services for the host system, the host system comprising a processor;
- a network compute subsystem for managing traffic over the network, the traffic over the network including traffic between the host system and the client and traffic between the server compute subsystem and the client, the network compute subsystem comprising an I/O subsystem, and a second set of dedicated processing resources and memory resources, the second set of dedicated processing resources comprising a second processor core configured to execute instructions for managing the traffic over the network, wherein the server compute subsystem and the host system are configured to communicate with the network via the I/O subsystem of the network compute subsystem; and
- a management compute subsystem for managing respective dedicated processing resources and memory resources for the server compute subsystem and the network compute subsystem, the management compute subsystem coupled to the server compute subsystem and to the network compute subsystem,
- wherein the SoC is capable to communicate with an external memory for each of the server compute subsystem and the network compute subsystem.

2. The SoC of claim 1, wherein the I/O subsystem includes a first interface to communicate with the server compute subsystem, a second interface to communicate with the host system, and a third interface to communicate with the network.

3. The SoC of claim 2, wherein the first interface and the second interface are Peripheral Component Interconnect Express (PCIe) interfaces.

4. The SoC of claim 1, wherein the external memory is physically or logically isolated from each of the network compute subsystem and the server compute subsystem.

5. The SoC of claim 1, wherein the network compute subsystem includes functionalities of a network interface controller (NIC), the host system includes an x86 processor, the first set of processing resources include a first ARM® processor, and the second set of processing resources include a second ARM® processor.

6. A system on a chip (SoC) configured to communicate with a host system, the SoC comprising:
- a server compute subsystem for providing compute services for the host system, wherein the host system operates as a server that provides compute services to a client through a network, and wherein the compute services provided for the host system include services provided to the client in connection with offloading of compute service tasks from the host system to the server compute subsystem, the server compute subsystem comprising a first set of dedicated processing resources and memory resources, the first set of dedicated processing resources comprising a first processor core configured to execute instructions for providing the compute services for the host system, the host system comprising a processor;
- a network compute subsystem for managing traffic over the network, the traffic over the network including traffic between the host system and the client and traffic between the server compute subsystem and the client, the network compute subsystem comprising a second set of dedicated processing resources and memory resources, the second set of dedicated processing resources comprising a second processor core configured to execute instructions for managing the traffic over the network, wherein the server compute subsystem and the host system are configured to communicate with the network via the network compute subsystem; and
- a management compute subsystem for managing respective dedicated processing resources and memory resources for the server compute subsystem and the network compute subsystem, the management compute subsystem coupled to the server compute subsystem and to the network compute subsystem.

7. The SoC of claim 6, wherein the network compute subsystem comprises an I/O subsystem and wherein the I/O subsystem includes a first interface to communicate with the server compute subsystem, a second interface to communicate with the host system, and a third interface to communicate with the network.

8. The SoC of claim 6, wherein the SoC is configured to communicate with an external memory and wherein the external memory is logically or physically isolated from either the network compute subsystem or the server compute subsystem such that only the network compute subsystem or the server compute subsystem can communicate with the external memory.

9. The SoC of claim 6, wherein the memory resources include one or more memory controllers, Level 1 caches, Level 2 caches or Level 3 caches.

10. The SoC of claim 6, wherein the management compute subsystem is configured to dedicate the first set of processing resources and memory resources to the server compute subsystem and the second set of processing resources and memory resources to the network compute subsystem.

11. The SoC of claim 6, wherein the management compute subsystem is configured to dedicate the first set and the second set of processing resources and memory resources based on a hardware or software configuration.

12. The SoC of claim 6, wherein the first set of the dedicated processing resources and memory resources are communicatively coupled to a server compute subsystem coherent interconnect network.

13. The SoC of claim 6, wherein the second set of the dedicated processing resources and memory resources are communicatively coupled to a network compute subsystem coherent interconnect network.

14. The SoC of claim 6, wherein the SoC further comprises one or more resources shared by the server compute subsystem and the network compute subsystem.

15. The SoC of claim 6, wherein the network compute subsystem is on a first power domain and the server compute subsystem is on a second power domain.

16. The SoC of claim 6, wherein the server compute subsystem and the network compute subsystem are in separate reset domains.

17. The SoC of claim 6, wherein the first set of dedicated processing resources and memory resources are not shared by the network compute subsystem, and the second set of dedicated processing resources and memory resources are not shared by the server compute subsystem.

18. A method for a System-on-Chip (SoC) configured to communicate with a host system, the method comprising:

powering up, by a management compute subsystem, a network compute subsystem and a server compute subsystem of the SoC, the network compute subsystem and the server compute subsystem coupled to the management compute subsystem, wherein the server compute subsystem is configured to provide compute services for the host system, wherein the host system operates as a server that provides compute services to a client through a network, wherein the compute services provided for the host system include services provided to the client in connection with offloading of compute service tasks from the host system to the server compute subsystem, and wherein the network compute subsystem is configured to manage traffic over the network, the traffic over the network including traffic between the host system and the client and traffic between the server compute subsystem and the client;

configuring a first set of dedicated processing resources and memory resources for the server compute subsystem by assigning the first set of dedicated processing resources and memory resources to the server compute subsystem from a first dedicated pool of processing resources and memory resources for the server compute subsystem, the first set of dedicated processing resources comprising a first processor core configured to execute instructions for providing the compute services for the host system; and configuring a second set of dedicated processing resources and memory resources for the network compute subsystem by assigning the second set of dedicated processing resources and memory resources to the network compute subsystem from a second dedicated pool of processing resources and memory resources available for the network compute subsystem, the second set of dedicated processing resources comprising a second processor core configured to execute instructions for managing the traffic over the network, wherein the network compute subsystem comprises an I/O subsystem, and the server compute subsystem and the host system communicate with the network via the I/O subsystem.

19. The method of claim 18, wherein the server compute subsystem communicates with the host system via the I/O subsystem.

20. The method of claim 18, further comprising resetting the server compute subsystem without resetting the network compute subsystem.

* * * * *